May 10, 1932.  F. J. FRANK ET AL  1,857,537
THIEVING TUBE
Filed Feb. 5, 1931
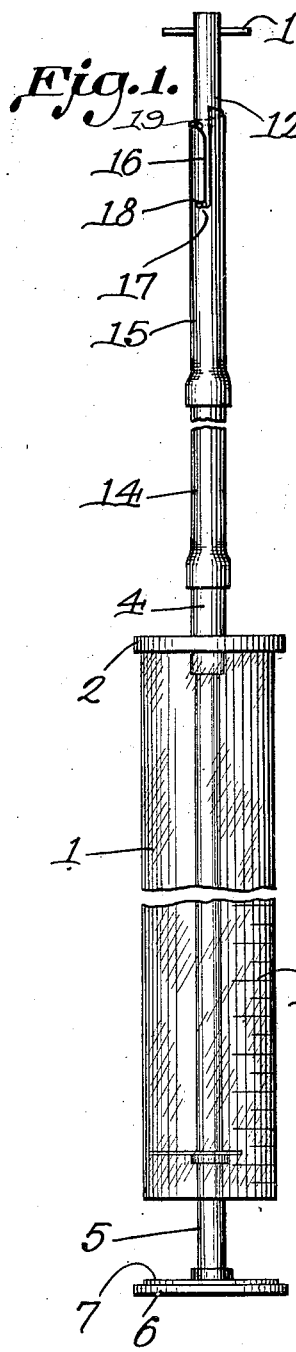
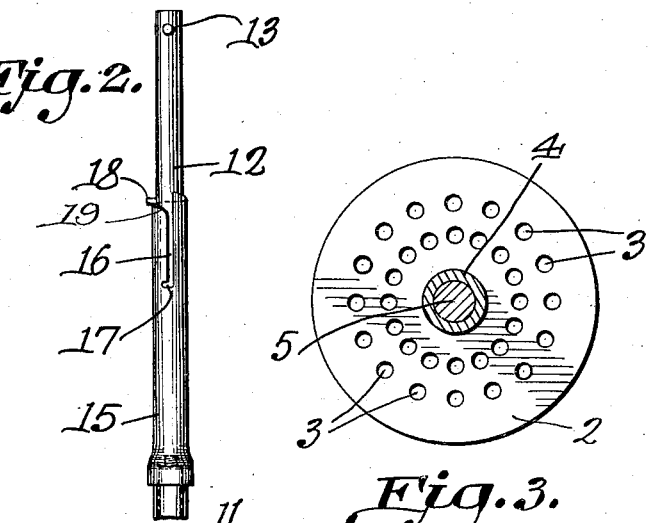
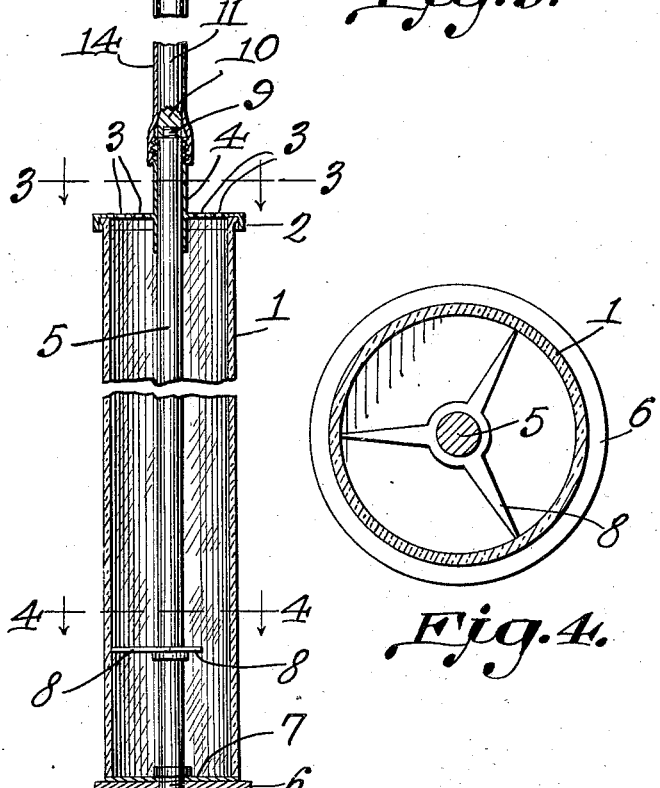
Fig.1. Fig.2. Fig.3. Fig.4.
Inventors
F. J. Frank
F. J. Shock
By C. A. Snow & Co.
Attorneys.

Patented May 10, 1932

1,857,537

UNITED STATES PATENT OFFICE

FREDERICK J. FRANK, OF ELIZABETH, AND FRANK J. SHOCK, OF SECAUCUS, NEW JERSEY

THIEVING TUBE

Application filed February 5, 1931. Serial No. 513,721.

This invention relates to an instrument designed for testing fluids contained in tanks and other like structures and is commonly known as a thieving tube. It is frequently found desirable to test the contents of storage tanks and portable tanks containing gasoline, fuel oils and other fluids for the purpose of ascertaining whether water, solids or other objectionable substances are mixed therewith. Various devices have been employed for this purpose but it has been difficult with any of them to obtain accurate specimens of the fluid. This has been true particularly where specimens have been desired from the lowermost portion of the container because agitation of the fluids due to actuation of the instrument when brought to the desired level has frequently scattered the sediment with the result that the specimen withdrawn has not accurately indicated the amount of sediment.

It has also been difficult to take accurate specimens of fluids at predetermined depths because of the agitation set up by the inrush of fluid and because of the lack of indicating means by means of which the depth at which the sample is being taken can be determined.

It is an object of the present invention to provide a simple but efficient device which does not have the objections heretofore enumerated but, on the contrary, is capable of trapping and withdrawing specimens from any predetermined level without disturbing the fluid to an objectionable extent, the withdrawn specimen accurately indicating the nature of the fluid in the container at the predetermined level.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings the preferred form of the invention has been shown.

In said drawings:

Figure 1 is an elevation of the device, parts being broken away and the valve being open.

Figure 2 is a longitudinal section through the body portion of the device, the valve being shown closed.

Figure 3 is an enlarged section on line 3—3, Figure 2.

Figure 4 is an enlarged section on line 4—4, Figure 2.

Referring to the figures by characters of reference, 1 designates the tubular body of the device. This can be made of transparent glass or it can be formed of an opaque material having a longitudinally extending transparent portion. In either case the tube is closed at its upper end by a head 2 which, as shown particularly in Figure 3, has a number of apertures 3 whereby air and liquid can flow freely through the head. A central sleeve 4 is formed integral with or fixedly connected to the head 2 and constitutes a guide for a rod 5. This rod extends longitudinally within the tubular body 1 and is provided at its lower end with a valve in the form of a thin flat disk 6 having a thin gasket 7 of cork or the like thereon, this gasket being designed to bear against and form a sealing contact with the lower end of the body 1. For the purpose of holding the lower portion of the rod properly centered in the body 1 lateral fingers 8 can be attached to the rod for sliding engagement with the inner surface of the tubular body.

The upper end of rod 5 is provided with a screw-threaded stud 9 and this adapted to be engaged by the recessed threaded end 10 of an extension rod 11. Any desired number of these extension rods can be used and each one of them is of predetermined length. For example, each of these extension rods can be two feet long and by connecting two of them to the rod 5 said rod will be elongated a known length, namely, four feet.

To the uppermost extension rod is detachably secured a terminal rod 12 constituting a handle portion and this can be provided with oppositely extending arms 13 by means of which the rod can be readily manipulated.

Sleeve 4 is detachably engaged by an extension sleeve 14. This is of a predetermined length and any number of sleeves can be used. If the extension rods are two feet long the extension sleeves are also to be two feet long. The uppermost extension sleeve is detachably engaged by a locking sleeve 15 having a longitudinal slot 16 extending thereinto from its upper end and terminating at its lower end in a lateral offset 17.

A pin 18 extends radially from the terminal rod 12 and is so located that when the valve is closed tight against the lower end of the tubular body 1 said pin will rest on the upper end of the locking sleeve 15.

As shown particularly in Figure 1 the tubular body can be graduated in the direction of its length, the graduations 19 being used to indicate units of measure such as inches and fractions thereof.

When it is desired to ascertain whether there is any sediment in the body of a tank a sufficient number of extension rods 11 and sleeves 14 are coupled together to allow the lower end of the device to be lowered to the bottom of the container holding the fluid to be tested. Rod 12 is shifted longitudinally with pin 18 in slot 16 and is then given a partial rotation to seat the pin 18 in offset 17. Thus the valve 6 will be held open as shown in Figure 1. The device can then be lowered carefully into the container until the valve comes in contact with the bottom thereof. As the tubular body 1 is lowered through the liquid free flow of said liquid through the apertured cap 2 is permitted so that the minimum disturbance of the fluid will be produced. Thus when the device reaches the bottom of the tank the fluid will be practically quiet and the sediment undisturbed. With the parts thus located the user turns the pin 18 out of offset 17 and then moves the locking sleeve 15 of the body 1 downwardly onto gasket 7. This will cut off from the surrounding fluid that portion above the valve. Following this operation and while the pin 18 is resting on the end of sleeve 15 the device is lifted from the tank and by inspecting the contents of body 1 it is possible to determine accurately the depth of sediment and the grades of fluids thereabove.

Should it be desired to inspect fluids at a predetermined point above the bottom of the container the device is opened as shown in Figure 1 and then lowered into the container until, by means of the extension sleeves 14 it can be determined when the body portion 1 has reached the point from which a specimen is to be removed. At that time the rod 12 is held firmly while sleeve 15 is rotated until pin 18 is removed from offset 17. The sleeve is then lowered and will promptly trap a sample of the liquid after which the valve can be locked as in Figure 2 and the specimen withdrawn and inspected.

This device is very simple in construction, can be easily carried on tank trucks or suspended adjacent to the point of use and is especially advantageous because it provides a means whereby accurate specimens can be trapped and withdrawn without previously producing an undesirable disturbance and mixing of the material to be inspected.

If desired the upper end of sleeve 15 can be inclined as shown at 19 so as to provide a cam on which pin 18 can slide whereby, as the rod 12 is rotated the valve will be tightened against the bottom of the tubular body.

What is claimed is:

A thieving tube including a tubular body having a transparent portion, an open lower end and an apertured upper end, a sleeve fixedly connected to the upper end of the body, a rod slidable therein and projecting thereabove, and a valve at the lower end of the rod for engagement by the lower end of the body to close said end, said sleeve and rod each including detachably connected sections, there being cooperating means on one of the sections of the sleeve and one of the sections of the rod for locking the valve in sealing contact with the open end of the body or in spaced relation to said body.

In testimony that we claim the foregoing as our own, we have hereto affixed our signatures.

FREDERICK J. FRANK.
FRANK J. SHOCK.